Patented June 4, 1940

UNITED STATES PATENT OFFICE 2,203,360

TREATMENT OF WOOD HYDROLYSATE SOLUTIONS

Alexander M. Partansky, Midland, Mich., assignor to The Dow Chemical Company, Midland, Mich., a corporation of Michigan No Drawing. Application October 10, 1938,
Serial No. 234,325

2 Claims. (Cl. 195—103)

This invention concerns a method for improving the fermentation characteristics of acid wood hydrolysate solutions.

Wood and other cellulosic and ligno-cellulosic materials may be treated with dilute mineral acids at elevated temperatures to obtain acid hydrolysate solutions rich in reducing sugars and other presumedly fermentable carbohydrate bodies. Such hydrolysate solutions, however, frequently prove unsatisfactory as a source of fermentable carbohydrate material due to the presence therein of furfural and certain unknown bodies, possibly lignin and cellulose decomposition products, which are toxic to the micro-organisms commonly employed in fermentation processes. This situation results in incomplete utilization of the sugar content when the hydrolysate solution is fermented, and has been overcome but partially by purification with activated charcoal and by carrying out the fermentation upon high dilutions of the hydrolysate solutions initially obtained.

I have discovered that if acid wood hydrolysate solution or comparable cellulosic or ligno-cellulosic hydrolysate product be adjusted to a pH value of between 9 and 10, and preferably about 9, with lime and aged, certain bodies are precipitated therefrom, the removal of which greatly improves the fermentation characteristics of the treated solution. While it is preferable that the pH of the liquor be maintained between 9 and 10 throughout the treatment, in practice this is not feasible due to the gradual reaction of the lime with certain constituents of the hydrolysate which results in a lowering of the pH. This tendency for the hydrogen ion concentration to become higher than desirable is overcome by mixing additional lime with the solution from time to time during the treatment. For best results, the solution is aged at between 20° and 40° C., and preferably at 25°-35° C., for a period varying between 24 to 48 hours, depending on the prevailing temperature. Deviation from the above limits of pH, temperature, and time is not productive of optimum results. In fact, the adjustment of such a crude sugar solution to an excessively high pH and/or the use of higher temperatures and longer treatment times results in partial or total disintegration of the sugars initially present and yields a carbohydrate solution not infrequently more toxic to fermentation organisms than the original hydrolysate. To preclude such potential sugar destruction and toxic formation, I neutralize excess alkali in the treated solution immediately following the removal of the precipitate formed during the alkaline treatment.

Among the desirable characteristics acquired by hydrolysate solutions treated according to my new process are (1) that being low in micro-organism inhibiting toxicants, a high percentage of the carbohydrates present can be fermented in a single operation, and (2) that more concentrated solutions thereof can be successfully fermented than would otherwise be possible. These improvements in the nature of the treated hydrolysate solutions greatly increase the practicability of fermentation operations thereon, both through providing for a maximum utilization of the sugar content of such materials, and by effecting substantial economies in the equipment required due to reduced operating volumes.

The fermentation organism employed in the comparative determinations summarized in subsequent table was *Clostridium felsineum*. This organism is described in Bergey's "Manual of Determinative Bacteriology", fifth Edition (October, 1938) on pages 766–767. This is a spore-forming anaerobe closely related to *Clostridium acetobutylicum* but differing from the latter in forming buff orange pigment in corn-mash media while the latter gives a light yellow color. In the presence of organic nitrogen source, it ferments starch, sugars and other carbohydrates with the formation of butanol, acetone, ethanol, carbon dioxide, hydrogen and small amounts of esters. This was obtained from the University of Wisconsin and is known as their "No. 41 Culture." The treatments and fermentations were carried out upon an acid wood hydrolysate solution obtained by digesting mixed hardwood sawdust with 0.75% aqueous sulfuric acid at elevated temperatures and pressures. This hydrolysate solution contained about 7% dissolved reducing substances calculated as glucose according to the Goose and Steele modification of Hagedorn-Jensen's method of determination as described in Anal. Ed. Ind. Eng. Chem. v. 7, p. 324.

In carrying out the treatment, the crude wood hydrolysate solution is cooled to 20°–30° C. and sufficient lime added to neutralize the acid and to bring the pH of the solution to 9–10. The liquor is then stored at a temperature of between 20° and 40° C. for a period of from 24 to 48 hours, the pH thereof being intermittently readjusted to between 9 and 10 by mixing with the hydrolysate additional lime. During the storage period a precipitate separates from the solution and collects on the bottom and sides of the containing vessel, forming, in conjunction with precipitated calcium sulfate, a sludge. The clear liquor is separated from this sludge and sufficient sulfuric acid added thereto to reduce the pH to about 5.0. Thereafter the acidified solution may be further treated to remove furfural by purification with activated charcoal. This charcoal treatment with subsequent filtration also serves to remove precipitated calcium sulfate.

A series of determinations were made to ascertain the comparative fermentability of treated and untreated hydrolysate solutions. The fermentations were carried out upon aqueous dilutions containing from 40 to 70 percent by volume of the concentrated hydrolysate solutions. In each instance, a small portion of the hydrolysate solution was mixed with water to the proper dilution, enriched with approximately 0.75 per cent of soy bean meal, and deaerated by boiling for several minutes. The medium was then cooled to 37°, the preferred fermentation temperature, and seeded with 5 per cent by volume of an activated corn-mash starter culture of *Clostridium felsineum*. The inoculated medium was then allowed to ferment at 37° C. for 48 hours, and the percentage thereafter determined by the modified Hagedorn-Jensen method, supra.

The following table summarizes representative results obtained with treated and untreated hydrolysate solutions. For purposes of comparison, data is also included on hydrolysate solutions treated at pH values of 8 and 11.

| pH | Temperature of treatment in °C. | Time of treatment in hours | Dilution in percentage by volume | Percentage fermented reducers |
|---|---|---|---|---|
| Crude liquor, charcoal treated | | | 40 | 24 |
| Do | | | 50 | Less than 10 |
| Do | | | 70 | Less than 10 |
| 8 | 20-21 | 24 | 40 | 2 |
| 8 | 20-21 | 24 | 50 | 8 |
| 8 | 30 | 24 | 50 | 13 |
| 8 | 30 | 24 | 60 | 5 |
| 8 | 37 | 24 | 60 | 13 |
| 8 | 37 | 24 | 70 | 9 |
| 9 | 20-21 | 24 | 50 | 77 |
| 9 | 30 | 24 | 50 | 78 |
| 9 | 30 | 24 | 60 | 77 |
| 9 | 37 | 24 | 60 | 76 |
| 9 | 37 | 24 | 70 | 61 |
| 9 | 30 | 48 | 60 | 71 |
| 9 | 37 | 48 | 70 | 72 |
| 10 | 20-21 | 24 | 40 | 74 |
| 10 | 20-21 | 24 | 60 | 75 |
| 10 | 20-21 | 24 | 70 | 75 |
| 10 | 30 | 24 | 40 | 74 |
| 10 | 30 | 24 | 60 | 75 |
| 10 | 30 | 24 | 70 | 74 |
| 10 | 37 | 24 | 40 | 73 |
| 10 | 37 | 24 | 70 | 72 |
| 10 | 20-21 | 48 | 40 | 72 |
| 10 | 20-21 | 48 | 50 | 72 |
| 10 | 30 | 48 | 60 | 72 |
| 10 | 37 | 48 | 40 | 65 |
| 11 | 20-40 | 24-72 | 40-70 | Very low |

Similar fermentation operations on hydrolysate, treated with lime at higher temperatures and over a longer period of time gave consistently lower percentage fermentation of reducers than was obtained with solutions treated according to the recommended procedure.

The value of the lime purification treatment, as herein disclosed, is not limited to the preparation of hydrolysate media for butanol fermentation with *Clostridium felsineum*, but may be applied with advantage wherever it is desired to prepare such compounds as ethyl alcohol, propyl alcohol, propionic acid, lactic acid, or citric acid by fermentation of wood hydrolysate or comparable acid hydrolysate solution with such representative micro-organisms as *Saccharomyces ellipsoideus*, *Saccharomyces cerevisiae*, *Propionibacterium pentosaceum*, *Lactobacillus pentoaceticus*, *Aspergillus niger*, etc.

I claim:

1. A method for treating acid wood hydrolysate solutions to remove materials tending to inhibit the normal fermentation thereof comprising the steps of adding sufficient lime to the hydrolysate to adjust the pH thereof to between 9 and 10, ageing the alkaline solution at temperatures between 20° and 40° C. for from 24 to 48 hours, while intermittently adding further amounts of lime as required to readjust the pH between the stated limits, separating precipitated solids, and neutralizing the treated liquor.

2. A method for treating acid wood hydrolysate solution to remove materials tending to inhibit the normal fermentation thereof comprising the steps of adding sufficient lime to the hydrolysate to adjust the pH thereof to about 9, ageing the solution at a temperature of between 25° and 35° C. for from 24 to 48 hours, while intermittently adding amounts of lime as required to readjust the pH between the stated limits, separating precipitated solids, and neutralizing the treated liquor.

ALEXANDER M. PARTANSKY.